(12) United States Patent
Di Cosola et al.

(10) Patent No.: US 8,371,185 B2
(45) Date of Patent: Feb. 12, 2013

(54) MEASURING DEVICE

(75) Inventors: Vito-Giuseppe Di Cosola, Hartheim (DE); Jurgen Tanner, Kandern (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 267 days.

(21) Appl. No.: 12/736,798

(22) PCT Filed: Apr. 22, 2009

(86) PCT No.: PCT/EP2009/054770
§ 371 (c)(1),
(2), (4) Date: Nov. 10, 2010

(87) PCT Pub. No.: WO2009/141204
PCT Pub. Date: Nov. 26, 2009

(65) Prior Publication Data
US 2011/0067492 A1    Mar. 24, 2011

(30) Foreign Application Priority Data

May 19, 2008 (DE) .......................... 10 2008 001 865

(51) Int. Cl.
*G01D 21/00* (2006.01)
(52) U.S. Cl. ........................................ 73/866.5
(58) Field of Classification Search ................ 73/866.5, 73/855, 761
See application file for complete search history.

(56) References Cited

U.S. PATENT DOCUMENTS

| 1,367,615 A | 2/1921 | Malone | |
|---|---|---|---|
| 6,402,031 B1 * | 6/2002 | Hall | 235/400 |
| 6,823,718 B2 * | 11/2004 | Sandford et al. | 73/37 |
| 8,037,753 B2 * | 10/2011 | Fehrenbach et al. | 73/290 R |
| 2008/0184827 A1 * | 8/2008 | Susfalk et al. | 73/866.5 |
| 2009/0272205 A1 * | 11/2009 | Brown et al. | 73/866.5 |

FOREIGN PATENT DOCUMENTS

| DE | 23 38 576 | | 2/1975 |
|---|---|---|---|
| DE | 43 94 395 | C2 | 11/1994 |
| DE | 195 47 890 | A1 | 6/1997 |
| DE | 102 32 088 | A1 | 2/2004 |
| DE | 10 2004 047 731 | B4 | 4/2006 |
| EP | 0 984 248 | A1 | 3/2000 |
| WO | WO 02/052239 | A1 | 7/2002 |
| WO | WO 2005/071379 | A1 | 8/2005 |
| WO | WO 2006/047899 | A1 | 5/2006 |

* cited by examiner

Primary Examiner — Jewel V Thompson
(74) Attorney, Agent, or Firm — Bacon & Thomas, PLLC

(57) ABSTRACT

A measuring device comprises a sensor module and an evaluation module mounted on the sensor module. The sensor module includes a first component having a first screw thread, and the evaluation module includes a second component having a second screw thread. The screw threads engage with one another by screwing; wherein the first or the second component has a slit, which essentially extends into the component in a plane perpendicular to the thread axis; and there are formed by the slit a first clamping limb and a second clamping limb of the component, which are separated from one another by the slit. On the component there is furthermore arranged an actuating element, which acts on the first clamping limb and the second clamping limb, and deflects the clamping limbs relative to one another, whereby the first screw thread and the second screw thread are clamped against one another and secured against rotation relative to one another.

11 Claims, 2 Drawing Sheets

MEASURING DEVICE

TECHNICAL FIELD

The present invention relates to a measuring device, especially a measuring device of industrial process measurements technology, for ascertaining a process measurement variable of a medium.

BACKGROUND DISCUSSION

Such measuring devices are frequently formed from modules and comprise a sensor module and an evaluation module connected with the sensor module. For this, for example, a housing of the evaluation module can be screwed with its housing neck onto a housing of the sensor module. This is especially a possibility for cast housings of the evaluation module, in the case of which screw threads are easy to implement. Such a screwed connection having a rotation preventer between a sensor module housing and a housing for an evaluation module is disclosed, for example, in Offenlegungsschrift DE10232088 A1.

For certain areas of application, however, —especially for areas of application with special hygiene requirements— stainless steel housings produced by a deep drawing method are preferable for the evaluation module. In such housings, a corresponding screw thread is implementable only with inordinately large effort. Nevertheless, it is desirable (for example, for reasons of platform technology) also to be able safely to mount such stainless steel housings on threads for conventional cast housings.

SUMMARY OF THE INVENTION

An object of the present invention consequently is to provide a measuring device which enables a reliable mounting of an evaluation module on a sensor module.

The object is achieved according to the invention by the measuring device which includes: a sensor module; and an evaluation module, which is mounted on the sensor module; wherein the sensor module has a first component with a first screw thread, and the evaluation module has a second component with a second screw thread; wherein the screw threads engage with one another by screwing; wherein the first or the second component has, in the region of its thread, a slit, which extends into the component essentially in a plane perpendicular to the thread axis; wherein there are formed by the slit a first clamping limb and a second clamping limb of the component, which are separated from one another by the slit; wherein on the component there is furthermore arranged an actuating element, which acts on the first clamping limb and on the second clamping limb, and which deflects the clamping limbs relative to one another, whereby the first screw thread and the second screw thread are clamped against one another and are secured against rotation relative to one another.

In an embodiment of the invention, the actuating element includes an actuating screw, which engages into an axially directed, threaded bore in one of the clamping limbs, and either pushes the clamping limbs apart or draws them together.

In an embodiment of the invention, the first component comprises a sensor module housing having an external thread, onto which is placed a neck opening of an evaluation module housing, wherein the external thread protrudes into an inner space of the evaluation module housing of the evaluation module; wherein the second component comprises a holding nut having the first and the second clamping limbs, which is screwed onto the external thread and is secured against rotation with respect to the sensor module housing by the clamping action of the clamping limbs; wherein the holding nut secures the evaluation module housing in a shape-interlocking manner at least in the axial direction.

In a further development of the invention, the sensor module housing of the invention is additionally secured against rotation by shape interlocking of the holding nut.

In a further development of the invention, the evaluation module contains electronic components for processing signals of the sensor module, wherein the holding nut has a carrier element, on which electronic components of the evaluation module are mounted.

In a further development of the invention, the evaluation module housing comprises a metal material, especially stainless steel, wherein the evaluation module housing can, in this case, be manufactured, for example, by a deep drawing method.

In a further development of the invention, the holding nut comprises a metal material—especially aluminum—or a synthetic material, or plastic, —especially an elastomer— wherein the synthetic material, or plastic, can, for the purpose of electromagnetic compatibility, have a metallized surface.

The measuring device of the invention is especially a measuring device of industrial process measurements technology for ascertaining a process measurement variable of a medium. Such process measurement variables include, for example, absolute pressure, relative pressure, pressure difference, temperature, fill level, mass- or volume flow, density, viscosity, pH-value, redox potential, conductivity, moisture, heat, or concentration of a substance.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
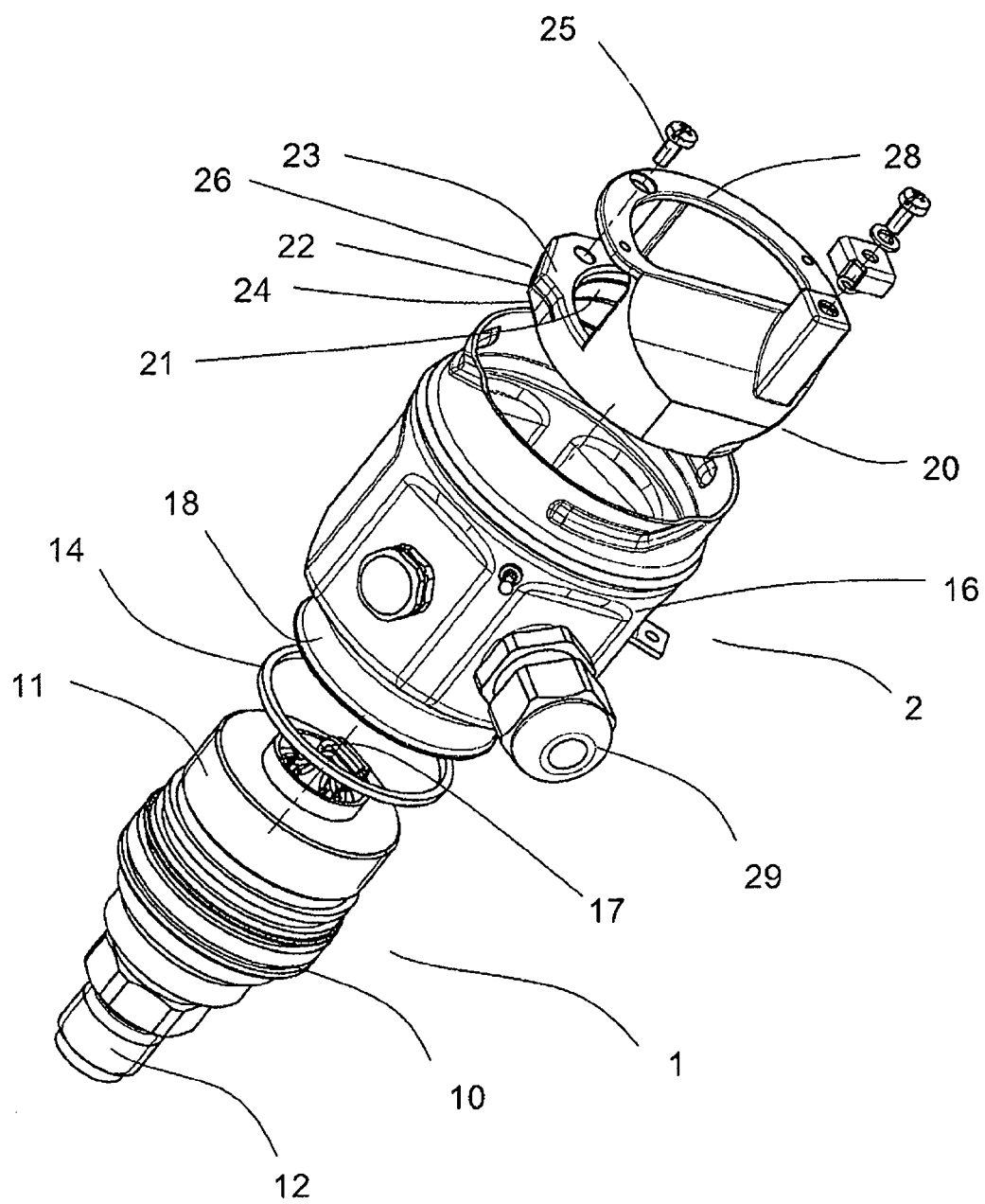
FIG. 1 is an exploded view of an example of an embodiment of a measuring device of the invention and, FIG. 2 is a cross-sectional view of an embodiment of the measuring device of the invention.
Figure 2:
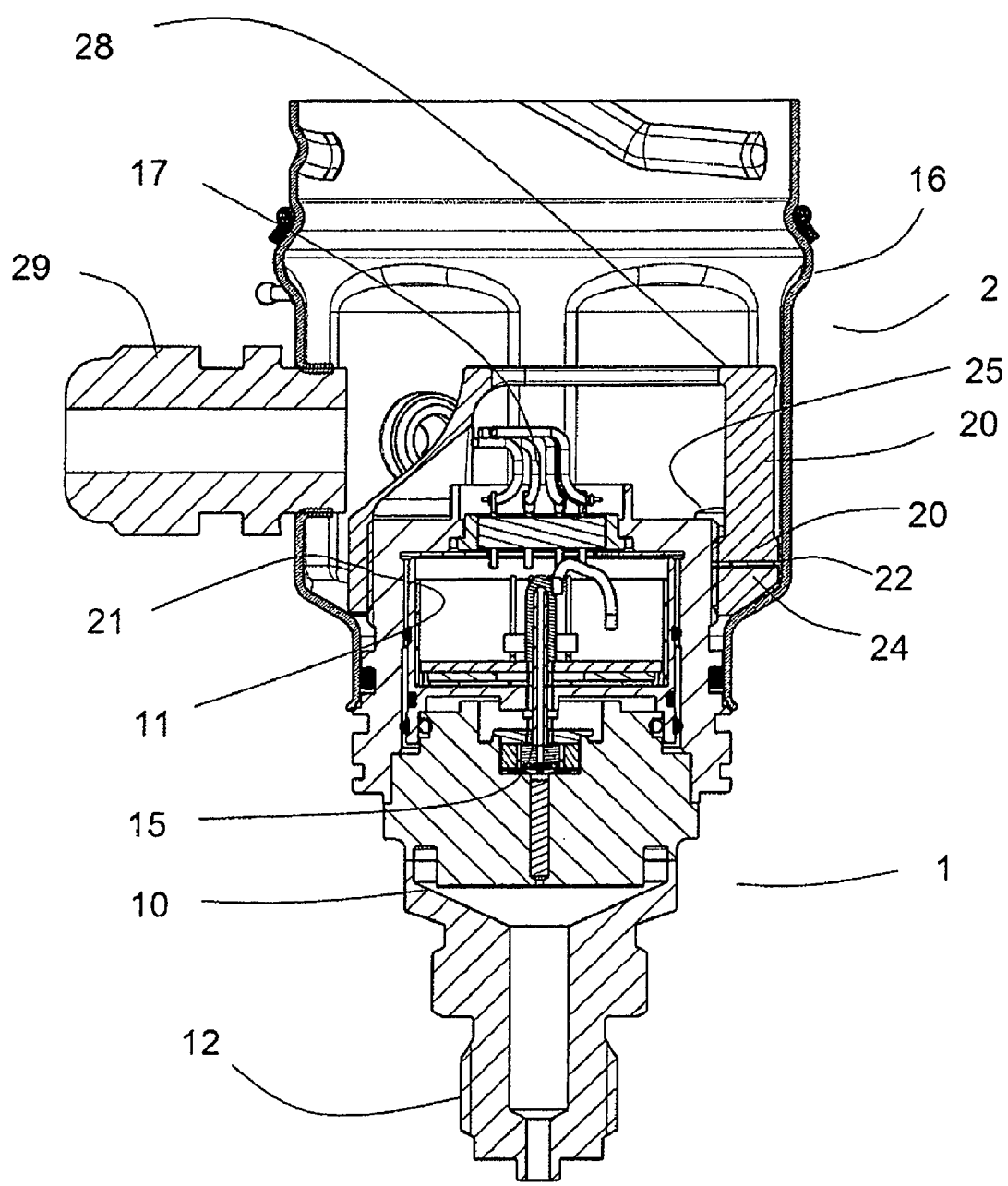

The measuring device shown in FIGS. 1 and 2 is an absolute, or relative, pressure sensor having a sensor module 1 and an evaluation module 2. The sensor module 1 includes a sectionally cylindrical, sensor module housing 10 having an evaluation module connecting thread 11 on a first end section of its lateral surface, and, on a second end section, a process connecting thread 12 for connection of the measuring device to a pipeline or to a container.

The evaluation module includes an evaluation module housing 16 made of stainless steel, this housing having been produced by a deep drawing method. The evaluation module housing 16 has a housing neck 18, with which it, along with a sealing ring 14, is placed on the sensor module housing 10, so that the evaluation module connecting thread 11 protrudes into an inner space of the evaluation module housing.

The evaluation module additionally includes a holding nut 20 made of aluminum, which has a sensor module connecting thread 21 embodied as an internal thread, with which the holding nut is screwed onto the evaluation module connecting thread 11. The holding nut 20 has a slit 22, which extends in a plane perpendicular to the thread axis, and which divides the section of the holding nut 20, in which the sensor module connecting thread 21 extends, into a first clamping limb 23 and a second clamping limb, wherein the second clamping limb faces the sensor module and secures the evaluation module housing 16 in a shape-interlocking manner against removal from the sensor module housing 10. A clamping screw 25 reaches through a bore 26 in the axial direction through the first clamping limb 23 into a clamping thread in the second clamping limb 24 aligning with the bore, and draws the two clamping limbs together, whereby the sensor module connecting thread 21 and the evaluation module connecting thread 11 are clamped against one another and locked against rotation relative to each other.

The evaluation module housing 16 has in a middle section a polygonal cross section, into which a contour of the holding nut 20 engages in a shape-interlocking manner. The evaluation module housing is therewith secured against rotation relative to the sensor module 1.

The holding nut 20 includes furthermore a carrier 28, on which components (not shown here) of the evaluating circuit are mounted, which, via an interface 12 on the facing end of the sensor module housing 10, are connected to a sensor ASIC 15 in the sensor module housing 10. The sensor signals processed by the evaluating circuit are led out from the evaluation module housing 16 via a connection line (not shown here) through a port 29 arranged laterally on the housing. The evaluation module housing 16 is sealed on the end facing away from the sensor module 1 with a lid (not shown here), especially with a stainless steel lid, which, in given cases, can contain a viewing window.

The invention claimed is:

1. A measuring device, comprising:
a sensor module, and
an evaluation module, which is mounted on said sensor module, wherein:
said sensor module has a first component with a first screw thread, and said evaluation module has a second component with a second screw thread;
the screw threads engage with one another by screwing;
said first or said second component has a slit, which extends into said second component essentially in a plane perpendicular to the thread axis;
whereby there are formed by said slit a first clamping limb and a second clamping limb of said second component, which are separated from one another by said slit;
wherein on said second component there is furthermore arranged an actuating element, which acts on said first clamping limb and said second clamping limb and deflects the clamping limbs relative to one another; and
whereby said first screw thread and said second screw thread are clamped against one another and are secured against rotation relative to one another.

2. The measuring device as claimed in claim 1, wherein:
said actuating module comprises an actuating screw, which engages into an axially directed, threaded bore in one of the clamping limbs and pushes the clamping limbs apart or draws them together.

3. The measuring device as claimed in claim 1, wherein:
said first component comprises a sensor module housing having an external thread, onto which is placed a neck opening of an evaluation module housing;
said external thread protrudes into an inner space of said evaluation module housing of said evaluation module;
said second component comprises a holding nut having said first and said second clamping limbs;
said holding nut is screwed onto said external thread and is secured against rotation with respect to said sensor module housing by clamping action of the clamping limbs; and
said holding nut secures said evaluation module housing in a shape-interlocking manner at least against removal from the sensor module.

4. The measuring device as claimed in claim 3, wherein:
said sensor module housing is additionally secured against rotation by shape interlocking of said holding nut.

5. The measuring device as claimed in claim 3, wherein:
said evaluation module includes electronic components for processing signals of said sensor module; and
said holding nut has a carrier element, on which electronic components of said evaluation module are mounted.

6. The measuring device as claimed in claim 3, wherein:
said evaluation module housing comprises a metal material, especially stainless steel.

7. The measuring device as claimed in claim 6, wherein:
said evaluation module housing is manufactured by a deep drawing method.

8. The measuring device as claimed in claim 3, wherein:
said holding nut comprises a metal material, especially aluminum.

9. The measuring device as claimed in claim 3, wherein:
said holding nut comprises a synthetic material, or plastic, especially an elastomer.

10. The measuring device as claimed in claim 9, wherein:
said synthetic material, or plastic, has a metallized surface.

11. The measuring device as claimed in claim 1, wherein:
the measuring device is a measuring device of industrial process measurements technology for ascertaining a process measurement variable of a medium.

* * * * *